US009910649B2

(12) United States Patent
Erwin et al.

(10) Patent No.: US 9,910,649 B2
(45) Date of Patent: Mar. 6, 2018

(54) INTEGRATING AND SHARING SOFTWARE BUILD COMPONENT TARGETS

(71) Applicant: International Business Machines Corporation, Armonk, NY (US)

(72) Inventors: Robert D. A. Erwin, Sunnyvale, CA (US); Timothy S. Keith, Hillsboro, OR (US); Michael C. Steinfeld, Portland, OR (US); Peter N. Steinfeld, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/000,916

(22) Filed: Jan. 19, 2016

(65) Prior Publication Data

US 2017/0206069 A1 Jul. 20, 2017

(51) Int. Cl.
*G06F 9/45* (2006.01)
(52) U.S. Cl.
CPC .................... *G06F 8/447* (2013.01)
(58) Field of Classification Search
CPC ........................................... G06F 8/447
USPC ........................................... 717/140
See application file for complete search history.

(56) References Cited

U.S. PATENT DOCUMENTS

| 5,761,499 | A | 6/1998 | Sonderegger | |
|---|---|---|---|---|
| 6,370,681 | B1 * | 4/2002 | Dellarocas | G06F 8/20 717/110 |
| 8,458,661 | B2 * | 6/2013 | Gu | G06F 8/71 717/101 |
| 8,607,223 | B2 | 12/2013 | Fors et al. | |
| 8,972,937 | B2 | 3/2015 | Gu | |
| 8,997,067 | B2 * | 3/2015 | Igelka | G06F 8/71 717/140 |
| 9,229,693 | B1 * | 1/2016 | Batni | G06F 8/37 |
| 2002/0199170 | A1 * | 12/2002 | Jameson | G06F 8/30 717/120 |

(Continued)

FOREIGN PATENT DOCUMENTS

GB 2351574 A * 1/2001 ............... G06F 8/47

OTHER PUBLICATIONS

Sommerville, "Component-Based Software Engineering," Software Engineering, 7th Edition, 2004, 7 pgs.

(Continued)

*Primary Examiner* — Ryan Coyer
(74) *Attorney, Agent, or Firm* — Shumaker & Sieffert, P.A.

(57) ABSTRACT

Techniques are described for sharing software targets in componentized automated software product build processes. In some examples, a method includes identifying among software component builds having dependencies on software targets, two or more software targets having a number of common dependencies that exceeds a threshold. The method further includes integrating the two or more software targets into at least one integrated software target. The method further includes assigning at least one subset of software component builds having dependencies on the two or more software targets, as having dependencies on the at least one integrated software target. The method further includes executing a software build process using the at least one integrated software target and the assigned dependencies of the at least one subset of the software component builds on the at least one integrated software target.

20 Claims, 10 Drawing Sheets

(56) References Cited

U.S. PATENT DOCUMENTS

| | | | |
|---|---|---|---|
| 2003/0163799 A1* | 8/2003 | Vasilik | G06F 8/71 717/100 |
| 2006/0136881 A1* | 6/2006 | Nesbitt | G06F 8/71 717/140 |
| 2007/0240102 A1 | 10/2007 | Bello et al. | |
| 2011/0239184 A1* | 9/2011 | Feigen | G06F 8/24 717/104 |
| 2013/0047137 A1* | 2/2013 | Bak | G06F 8/71 717/121 |
| 2013/0198717 A1 | 8/2013 | Igelka | |
| 2014/0258977 A1 | 9/2014 | Bagheri et al. | |
| 2015/0261653 A1* | 9/2015 | Lachambre | G06F 11/3616 717/126 |
| 2015/0378697 A1* | 12/2015 | Sathyanathan | G06F 8/41 717/146 |

OTHER PUBLICATIONS

Leigh et al., "Develop an automated build engine for Service Component Architecture applications using WebSphere Integration Developer," International Business Machines Corporation, Nov. 14, 2007, 26 pgs.

University of Tennessee at Chattanooga, "Component-based software engineering," University of Tennessee, Chapter 17, Software Reuse, Retrieved from <http://www.utc.edu/center-information-security-assurance/docs/4900-17-componnent-based.pptx> on Nov. 18, 2015, 55 pgs.

* cited by examiner

INTEGRATING AND SHARING SOFTWARE BUILD COMPONENT TARGETS

TECHNICAL FIELD

This disclosure relates to componentized automated software product build processes.

BACKGROUND

Enterprise software products may be large and complex, and may include a number of software components that are shared among multiple software products. These software components may have dependencies on each other. Enterprise software development systems may facilitate development of each of numerous enterprise software products by teams of software developers who may incorporate frequent updates to software components. Enterprise software development systems may manage and execute frequent builds of new versions of the software components. These builds may result in changes to the software components that affect their versions, dependencies, and the way that the software components are incorporated into enterprise software systems.

SUMMARY

In one aspect of the invention, a method includes identifying, among a plurality of initial software component builds having dependencies on a plurality of software targets, at least one set of two or more software targets having a number of common dependencies that exceeds a threshold. The method further includes integrating the two or more software targets into at least one integrated software target. The method further includes assigning at least one subset of software component builds having dependencies on the two or more software targets in the at least one set of two or more software targets, as having dependencies on the at least one integrated software target. The method further includes executing a software build process using the at least one integrated software target and the assigned dependencies of the at least one subset of the software component builds on the at least one integrated software target.

In another aspect, a computer program product includes a computer-readable storage medium having program code embodied therewith. The program code is executable by a computing device to identify among a plurality of initial software component builds having dependencies on a plurality of software targets, at least one set of two or more software targets having a number of common dependencies that exceeds a threshold. The program code is further executable by a computing device to integrate the two or more software targets into at least one integrated software target. The program code is further executable by a computing device to assign at least one subset of software component builds having dependencies on the two or more software targets in the at least one set of two or more software targets, as having dependencies on the at least one integrated software target. The program code is further executable by a computing device to execute a software build process using the at least one integrated software target and the assigned dependencies of the at least one subset of the software component builds on the at least one integrated software target.

In another aspect, a computer system includes one or more processors, one or more computer-readable memories, and one or more computer-readable storage mediums. The computer system further includes program instructions, stored on at least one of the one or more storage devices for execution by at least one of the one or more processors via at least one of the one or more memories, to identify among a plurality of initial software component builds having dependencies on a plurality of software targets, at least one set of two or more software targets having a number of common dependencies that exceeds a threshold. The computer system further includes program instructions, stored on at least one of the one or more storage devices for execution by at least one of the one or more processors via at least one of the one or more memories, to integrate the two or more software targets into at least one integrated software target. The computer system further includes program instructions, stored on at least one of the one or more storage devices for execution by at least one of the one or more processors via at least one of the one or more memories, to assign at least one subset of software component builds having dependencies on the two or more software targets in the at least one set of two or more software targets, as having dependencies on the at least one integrated software target. The computer system further includes program instructions, stored on at least one of the one or more storage devices for execution by at least one of the one or more processors via at least one of the one or more memories, to execute a software build process using the at least one integrated software target and the assigned dependencies of the at least one subset of the software component builds on the at least one integrated software target.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
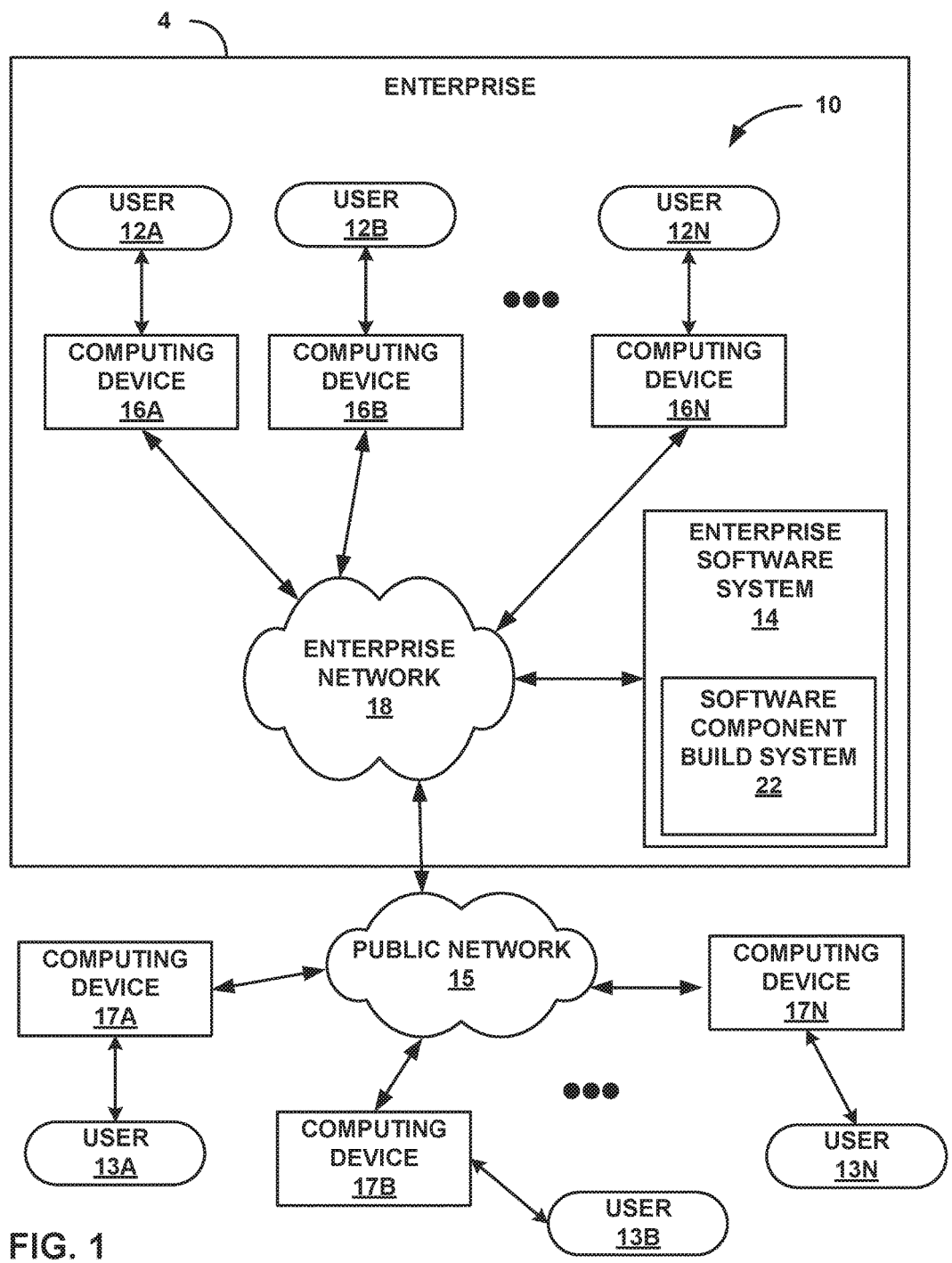
FIG. 1 shows a block diagram illustrating an example system that may perform an automated build process, in some examples of this disclosure.

Various examples are disclosed herein for techniques, methods, and systems generally directed to integrating and sharing software targets ("targets") for software component builds that may depend on the targets. For example, the automated build process of a large business enterprise application may include the building of many components. The building of each software component may take time and resources away from other steps in the build process. The automated build process as a whole may take time and resources away from other applications and tasks. Thus, performance and speed are important considerations in the automated build process of a business enterprise application. Even the construction of a relatively small software component for the automated build process of a business enterprise application may take several minutes. If an automated build process includes more than one business enterprise application, there may be even more software components to construct.

Software components may have dependencies on other software components. Software components which directly depend on a software component are called direct dependencies of the software component. Software components that directly or indirectly depend on the direct dependencies are called indirect dependencies of the software component. The combination of all of the direct and indirect dependencies is called the software target of the software component. In order to build the software component, a build system must first create the software component's software target in order to satisfy the software component's direct and indirect dependencies. A software build system that builds an enterprise software product may build many software components, each of which has a software target.

For an automated build of a single business enterprise application including more than one software component, a first software component may depend on the construction of a second software component. In some examples, the automated build process may require the results of the build of the second software component as a prerequisite for the construction of the first software component. As a result, the automated build process must build the second software component before building the first software component. The building of the first software component may use, as an input, the results of the build for the second software component.

To make the automated build process more efficient, the automated build process may analyze the software components and their respective dependencies at the beginning of the automated build process. The application may already specify the dependencies of each software component, or the automated build process may need to determine the dependencies at the beginning of automated build process. When the automated build process is initiated, the automated build process may detect all of the new dependencies that have been created since the last time that the automated build process ran. The automated build process may then determine a target for a particular software component. It is possible that yesterday's build for software component A had a different target than today's build for software component A, possibly due to changes to contents of the components, changes in the dependencies of the components, or changes to the automated build process in the interim.

Target calculation for an automated build process may take a relatively substantial amount of time. To maximize the performance of an automated build process, it may be important to determine the targets of the software components as quickly as possible because the targets for a particular software component may change every day. A completely automated process that determines the targets of software components may be an effective approach.

In some examples, a static automated build process may include entering the targets as inputs at the front end of the process. A dynamic automated build process may include constructing the targets during the componentized build process. A static automated build process may be faster than a dynamic automated build process because the time of constructing targets may be expended outside of the build process. Therefore the procedure for static and dynamic builds may be different. As a result, the actual, total time for a static automated build process may be shorter than the total time for a dynamic automated build process.

Using a dynamic automated build process, the componentized build process may construct each software component as a separate operation. The componentized build process may determine the target for each software component and construct the respective targets. Target building may have a significant effect on performance by adding time to the build process. The build for each target may take on the order of a few minutes of processing time, even for a relatively small target. A faster approach may involve calculating, at the start of the build process, the list of the components that make up the target for each software component without actually constructing the targets.

One approach to building targets dynamically while reducing the time for the target building process may be to share one target among multiple software components of an automated build process. This approach may require that two or more software components share dependencies. The targets for two similar software components may be very similar with large amounts of overlap between the targets of the two similar components. This result may be possible by identifying different targets of different software components having a number of common dependencies that exceeds a threshold, integrating the targets of the different software components into a single, integrated target, and assigning the different software components the same, integrated target, instead of the software components' earlier, separate targets. The execution of the automated build process may use the integrated target for the construction of the different software components. For larger and more complex automated builds, the potential improvements in performance may be greater than the potential improvements for small automated builds.

An automated build process may construct many components and may include optimizing techniques such as parallel build processing. For example, if two components are not dependent on each other, they can be built in parallel. By enabling multiple components to share targets, this disclosure may remove obstacles to additional parallel build processing. These obstacles may happen if the components that make up the targets are stored in a shared resource that can only be accessed serially by the build process. Typically, this serial access is implemented by locking the shared resource. In this case, even though two components can be built in parallel, the construction of their targets cannot be built in parallel because the shared resource that stores the target components must be accessed serially. If this shared resource is used in other aspects of the build, the locking to create targets may reduce other opportunities for parallelism in the build process where the shared resource is accessed. This disclosure may reduce the number of targets created and may also reduce the amount of time that shared resources are locked and thereby increase opportunities for parallel build processing.

FIG. 1 shows a block diagram illustrating an example system that may perform an automated build software process, in some examples of this disclosure. FIG. 1 illustrates an example context in which software component build system 22 of this disclosure may be used. Software component build system 22 may interact with the enterprise network 18 through automated build system 28 (FIG. 2), as further described below. FIG. 1 is a block diagram illustrating an example enterprise 4 having a computing environment 10 in which a plurality of users 12A-12N within enterprise 4 (collectively, "enterprise users 12" or "users 12") may interact with an enterprise software system 14 that includes software component build system 22, as described further below.

In the system shown in FIG. 1, enterprise software system 14 is communicatively coupled to a number of client computing devices 16A-16N (collectively, "client computing devices 16" or "computing devices 16") by enterprise network 18. Users 12 interact with their respective computing devices 16 to access enterprise software system 14. Users 12, computing devices 16, enterprise network 18, and enterprise software system 14 may all be either in a single facility or widely dispersed in two or more separate locations anywhere in the world, in some examples.

For exemplary purposes, various examples of the techniques of this disclosure may be readily applied to various software systems, including enterprise business intelligence systems or other large-scale enterprise software systems. Examples of enterprise software systems include enterprise financial or budget planning systems, order management systems, inventory management systems, sales force management systems, business intelligence tools, enterprise reporting tools, project and resource management systems, and other enterprise software systems.

In some examples, enterprise software system 14 includes servers that run dashboard web applications or enterprise applications and may provide business enterprise software. A user 12 may run an enterprise application on a client computing device 16 to view and manipulate information and other collections and visualizations of data. This data may include data from any of a wide variety of sources within enterprise 4, as well as data from a variety of external sources that may be accessible over public network 15, including external client computing devices 17A-17N (collectively, "external client computing devices 17" or "computing devices 17") used by external users 13A-13N ("external users 13"). Enterprise 4 may thus make software component build system 22 available to any of enterprise users 12 and/or external users 13.

Users 12, 13 may use a variety of different types of computing devices 16, 17 to interact with enterprise software system 14 and access data web application and enterprise applications via enterprise network 18. For example, a user 12 may interact with enterprise software system 14 and run an automated build process using a laptop computer, a desktop computer, or the like. Alternatively, a user 12 may use a smartphone, tablet computer, or similar device to interact with enterprise software system 14 through a web browser, a dedicated mobile application, or other means for interacting with enterprise software system 14. An external user 13 may also access software component build system 22 via a smartphone, tablet computer, or similar device, running an automated build process in a web browser, a dedicated mobile application, or other means for interacting with certain externally surfaced functions of enterprise software system 14.

Software component build system 22 may construct software components for automated build processes within enterprise software system 14. In some examples, the automated build processes may construct software relating to business intelligence, cloud computing, or sales. Enterprise 4 may utilize software component build system 22 to implement or improve its automated build processes.

Enterprise network 18 and public network 15 may represent any communication network, and may include a packet-based digital network such as a private enterprise intranet or a public network like the Internet. In this manner, computing environment 10 can readily scale to suit large enterprises. Users 12 may directly access enterprise software system 14 via a local area network, or may remotely access enterprise software system 14 via a virtual private network, remote dial-up, or similar remote access communication mechanism.

Figure 2:
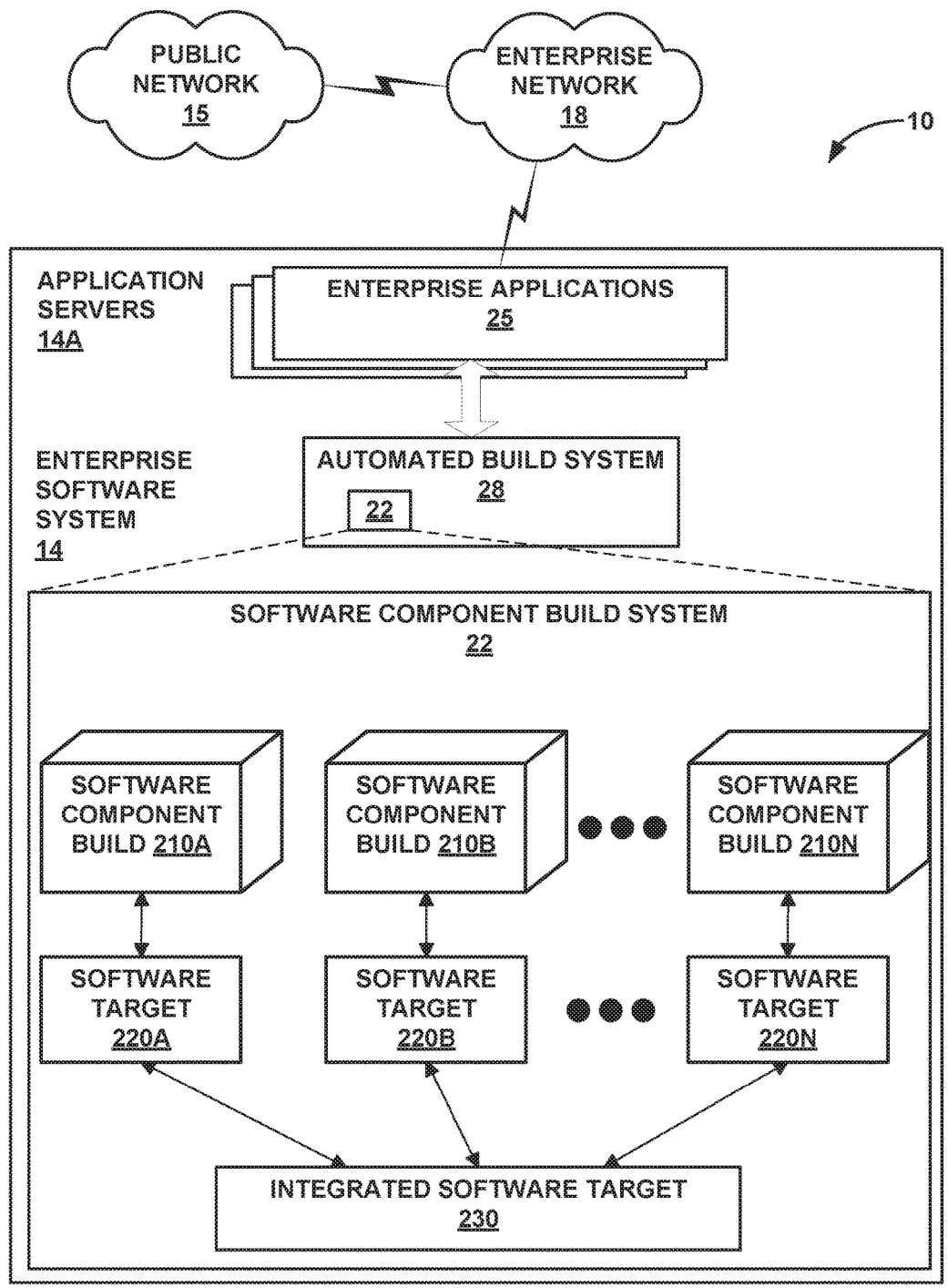
FIG. 2 shows a conceptual block diagram illustrating in further detail portions of a software component build system, in some examples of this disclosure.

FIG. 2 shows a conceptual block diagram illustrating in further detail portions of software component build system 22, in some examples of this disclosure. In some examples, enterprise applications 25 may exchange information with automated software build system 28 that includes software component build system 22. Automated software build system 28, configured with software component build system 22, may build software applications by constructing individual software components according to the techniques of this disclosure.

FIG. 2 depicts additional detail for enterprise software system 14 and how enterprise software system 14 may be accessed via interaction with application servers 14A. Public users 13 and users 12 may access enterprise software system 14 via public network 15 and enterprise network 18, respectively. Public network 15 and enterprise network 18 may allow users to run enterprise applications 25 on application servers 14A.

Software component build system 22 may be hosted among automated build system 28, as in the example depicted in FIG. 2, or may be hosted elsewhere, including on a client computing device 16A/17A (which may be a client computing device 16A internal to computing environment 10 or a client computing device 17A external to computing environment 10 in different examples), or distributed among various computing resources in enterprise software system 14, in some examples. Software component build system 22 may be implemented as or take the form of a stand-alone application, a portion or add-on of a larger application, a library of application code, a collection of multiple applications and/or portions of applications, or other forms, and may be executed by any one or more servers, client computing devices, processors or processing units, or other types of computing devices. As described above and further below, software component build system 22 may be implemented in one or more computing devices, and may involve one or more applications or other software modules that may be executed on one or more processors.

Software component build system 22 may include one or more software component builds 210A, 210B, . . . 210N ("software component builds 210") and one or more software targets 220A, 220B, . . . 220N ("software targets 220"). Each of the software component builds 210 may represent a specific function within a software application, which software application is generated at the completion of automated build system 28. In some examples, software component build 210A may represent libraries for the operation of automated build system 28 or the finished product software application that is generated at the completion of automated build system 28. In some examples, software component build 210B may represent a process that communicates with data warehouses and executes queries. In some examples, software component build 210N may represent a process that performs calculations on data related to business intelligence projects that exist within enterprise applications 25. In some examples, software component build 210N may represent a component specific to an operating system such as Windows® or Linux®. In some examples, software component build 210N may represent a component specific to an aspect of the implementation of functionality such as the software component's user interface, the software component's control, or the software component's access to a database. In some examples, software component build 210N may represent a component specific to the software component's implementation language such as Java®, JavaScript®, C, C++, Fortran, Cobol, C#, or any other computer programming language.

To construct software component build 210A, software component build system 22 may first need to construct software target 220A. The creation of software component build 210A may require the contents of software target 220A. The contents of software target 220A may include output from the construction of other software component builds 210 or content that is external to automated build system 28. External content contained in software targets 220 may not require the construction of any other software component builds 210. For internal content such as software component build 210A that depends on and requires the construction of software component build 210N, software component build system 22 may organize the build process so that software component build 210N is constructed before software component build 210A. Therefore, software target 220A may include the contents of software component build 210N. Software component build system 22 may organize all external target content for all software component builds 210. This external target content may be contained within software targets 220. In some examples, software component build system 22 may create one or more integrated software target 230 for all of the external target content for software component builds 210.

Software component build system 22 may integrate one or more of software targets 220 into integrated software target 230. Integrated software target 230 may include the contents from one or more of software component builds 210, which may be referred to as internal content. In some examples, there may be an integrated software target 230 containing only external content. Although only one integrated software target 230 is depicted in FIG. 2, automated build system 28 may have more than one integrated software target 230.

Software component build system 22 may generate integrated software target 230 by first identifying two or more of software targets 220 that have significant overlap. Software component build system 22 may identify significant overlap by comparing a number of common dependencies to a threshold value. Software component build system 22 may then integrate the two or more of software targets 220 that have significant overlap into integrated software target 230. Software component build system 22 may then assign the respective software component builds 210 as having dependencies on integrated software target 230. In some examples, automated build system 28 may execute a software build process using the integrated software target 230 and the assigned dependencies. This method may make automated build system 28 more efficient by allowing software component builds 210 to share targets through integrated software target 230.

Figure 3:
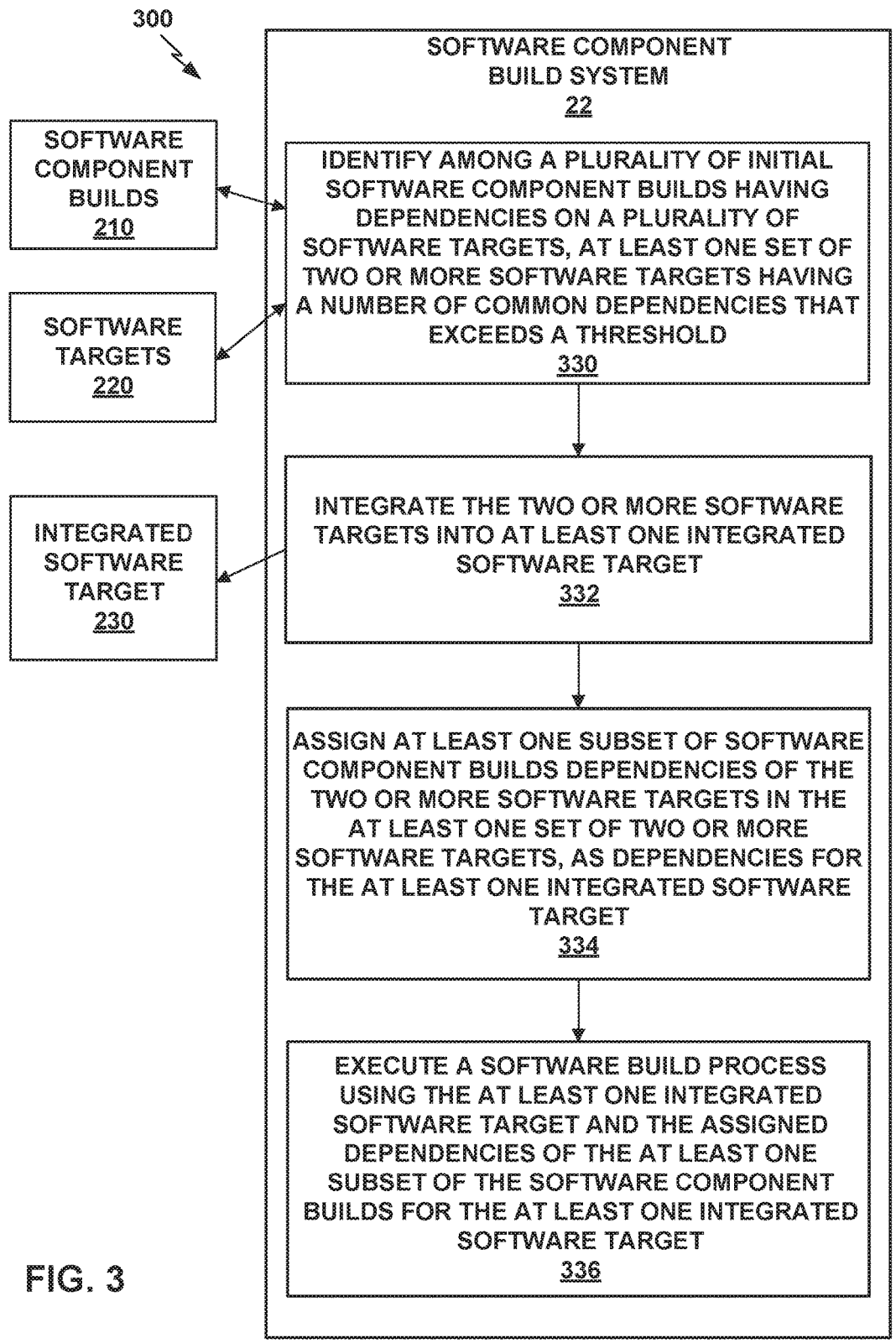
FIG. 3 shows a conceptual block diagram of a software component build system configured to perform a target sharing process, in some examples of this disclosure.

FIG. 3 shows a conceptual block diagram of a software component build system 22 configured to perform a target sharing process, in some examples of this disclosure. Software component build system 22 may include one or more steps, such as identifying at least one set of two or more of software targets 220 having a number of common dependencies that exceeds a threshold (330). Within software component build system 22, there may be a plurality of initial software component builds 210 that have dependencies on a plurality of software targets 210. The threshold may, for example, be at least 50% of the dependencies that a set of two or more software targets have in common, or at least 75%, or at least 90% of their dependencies in common, or any of various other values that may be selected as a threshold. Software component build system 22 may integrate the two or more software targets 220 that have a number of common dependencies that exceeds a selected threshold into at least one integrated software target 230 (332). Software component build system 22 may assign the software component builds 210 having dependencies on the two or more software targets 220 as having dependencies on the integrated software target 230 (334). Software component build system 22 may execute a software build process using the integrated software target 230 (336). Software component build system 22 may also use the assigned dependencies of the at least one subset of the respective software component builds 210 to execute the software build process (336).

Figure 4:
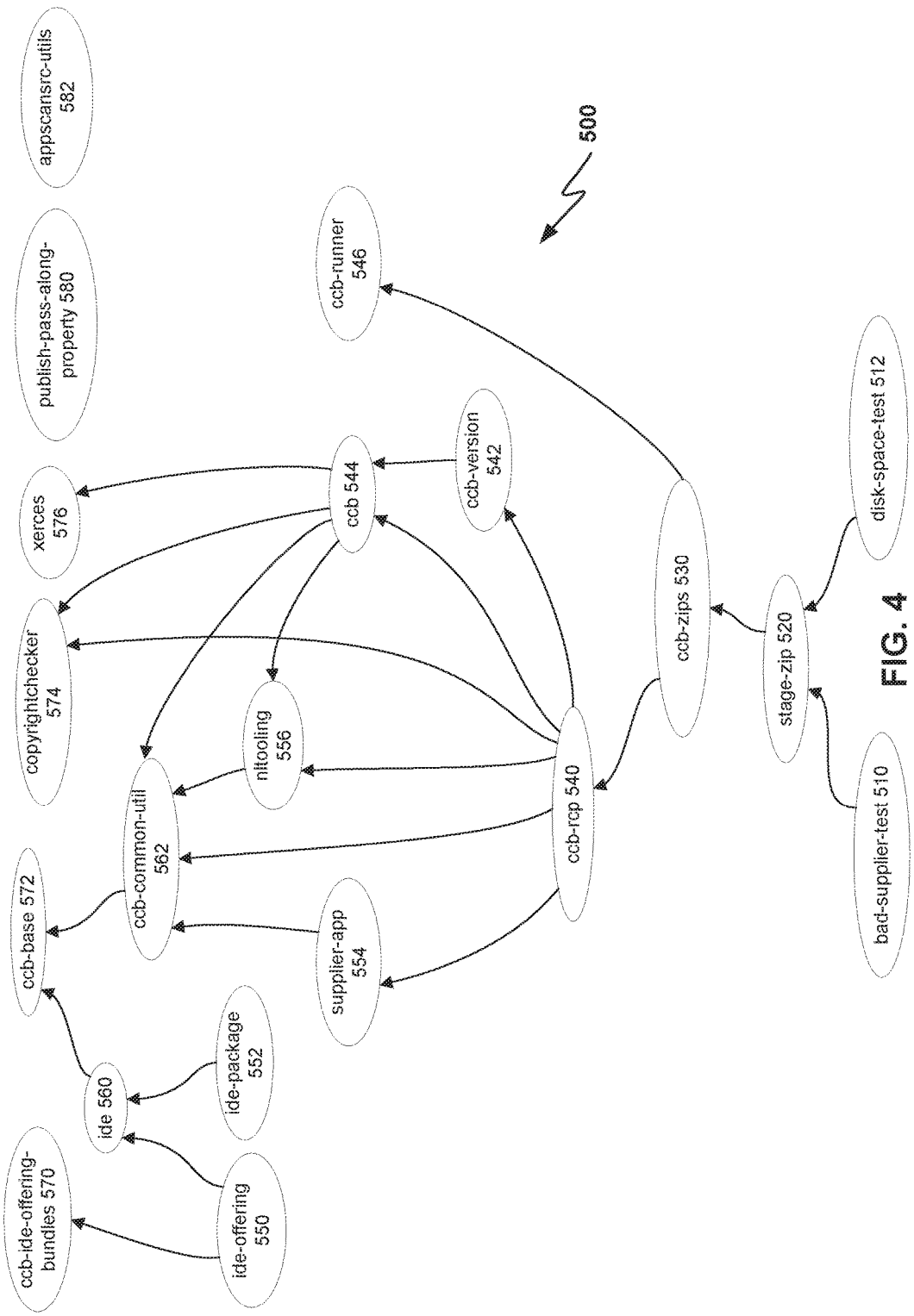
FIG. 4 shows a conceptual block diagram illustrating an automated build process with multiple build components, in some examples of this disclosure.

FIG. 4 depicts a conceptual block diagram of automated build process 500 with multiple build components 510-582, in some examples of this disclosure. In some examples, automated build process 500 may have hundreds of components, or more, rather than twenty components, as shown in FIG. 4. The arrows between the build components in automated build process 500 may represent dependencies between two particular build components. For example, bad-supplier-test 510 and disk space-test 512 may be dependent on stage-zip 520, which may be dependent on ccb-zips 530. In this example, ccb may refer to common component build. Build component ccb-rcp 540 may be dependent on more than one build component. ccb-rcp 540 may be dependent on several other components, including ccb-version 542, ccb 544, supplier-app 554, nitooling 556, ccb-common-util 562, and copyrightchecker 574. Other components in FIG. 4 may be dependent on any number of other components.

In some examples, if ide-offering 550 is dependent on ccb-ide-offering-bundles 570, automated build process 500 may construct ccb-ide-offering-bundles 570 before constructing ide-offering 550. Automated build process 500 may use the results of the construction of ccb-ide-offering-bundles 570 as part of a target for ide-offering 550. Automated build process 500 may determine the dependencies between build components in order to increase the speed and performance of the build process. Automated build process 500 may identify whether the target for ide-offering 550 has significant overlap with the targets for any other components. Automated build process 500 may identify the target for ide-package 552 as having significant overlap with the target for ide-offering 550. In particular, ide-package 552 and ide-offering 550 share a dependency on ide 560. Automated build process 500 may integrate the targets for ide-package 552 and ide-offering 550 and assign ide-package 552 and ide-offering 550 as having dependencies on the integrated target (not shown in FIG. 4). During its execution, automated build process 500 may use the integrated target and the assigned dependencies of ide-package 552 and ide-offering 550 in order to construct ide-package 552 and ide-offering 550.

Some build components, such as publish-pass-along-property 580 and appscansrc-utils 582, have no dependencies arrows in FIG. 4. Even if appscansrc-utils 582 has no dependencies with other build components, appscansrc-utils 582 may share targets with other build components. This is possible because appscansrc-utils 582 may be dependent on external content, and other build components may be dependent on the same external content. Automated build process 500 may be able to save processing time if two or more build components share the same target. If two or more build components share the same target, automated build process 500 may construct the contents of the target once and use the constructed contents for the two or more build components.

Figure 5:
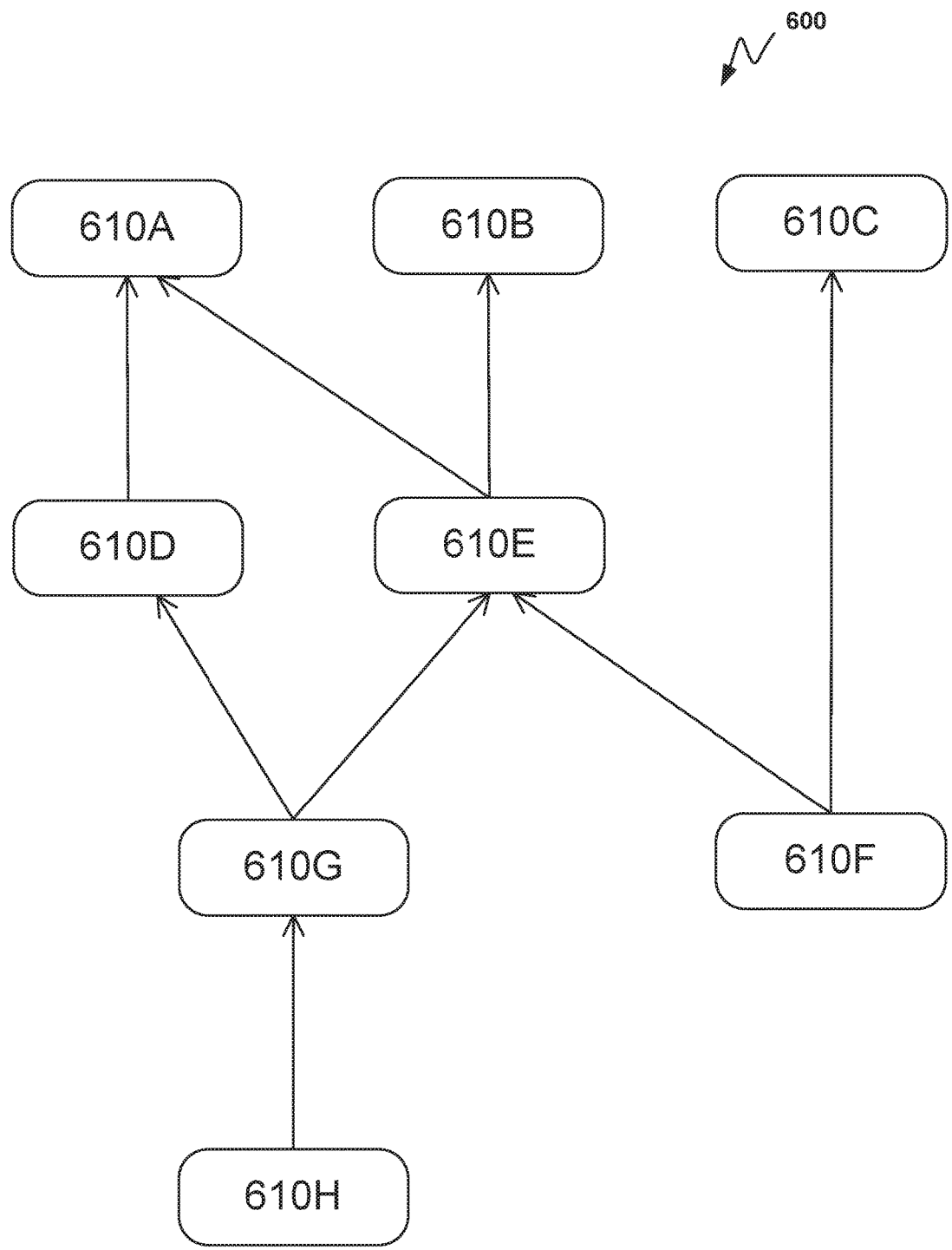
FIG. 5 shows a conceptual block diagram illustrating a directed graph structure of a componentized automated build process including build components, in some examples of this disclosure.

FIG. 5 is a conceptual block diagram depicting a directed graph structure of componentized automated build process 600 including build components 610, in some examples of this disclosure. The arrows between build components 610 represent dependencies between two particular build components 610. For example, build components 610A, 610B, and 610C may not depend on any other build components 610. Build component 610H may have an internal dependency on the content of build component 610G, as depicted by an arrow in automated build process 600. Build component 610G may have an internal dependency on the content of build components 610D and 610E, as depicted by the arrows in automated build process 600. Other dependencies may be represented by arrows between components 610.

Automated build process 600 may include the creation of targets (not shown in FIG. 5) for each build component 610. The contents of each of the targets may be necessary for automated build process 600 to construct the respective build components 610. The structure of each target may be subject to certain requirements in metadata and content. The construction of each of the targets for build components 610 may have a significant impact on performance of automated build process 600. The construction of a target involves overhead costs, so that the more targets that automated build process 600 creates, the more that the performance of automated build process 600 may suffer. Sharing targets between build components 610 may require the construction of fewer targets and result in an increase in performance.

Figure 6:
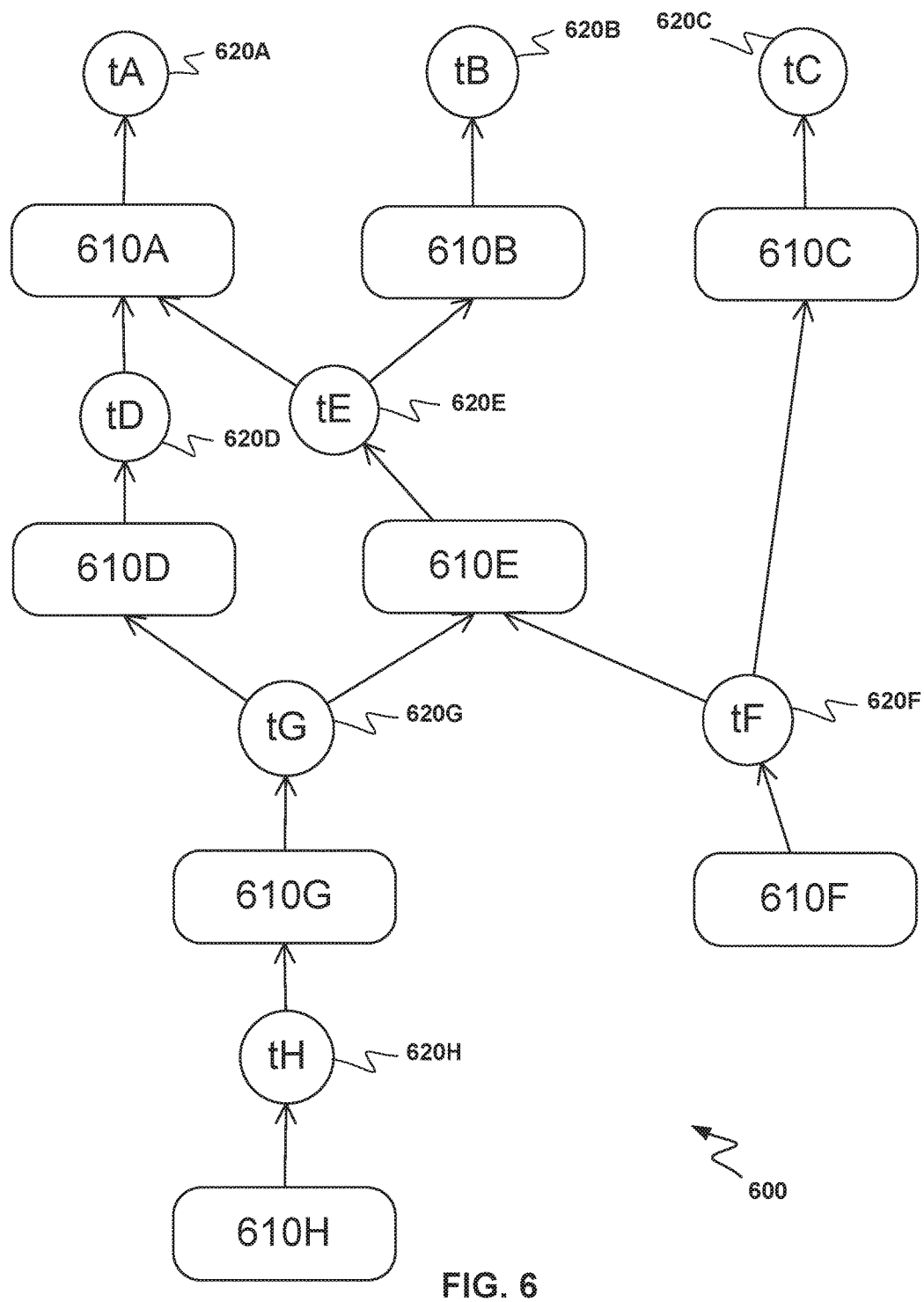
FIG. 6 shows a conceptual block diagram illustrating a directed graph structure of componentized automated build process including software targets of each build component, in some examples of this disclosure.

FIG. 6 is a conceptual block diagram depicting a directed graph structure of componentized automated build process 600 including software targets 620 ("targets") of each build component 610, in some examples of this disclosure. In the depicted embodiment, build component 610H may have target tH (620H), which may represent the contents of build component 610G. Build component 610G may have target tG (620G), which may include the contents of build components 610D and 610E. Build component 610F may have target tF (620F), which may include the contents of build components 610C and 610E. Build components 610G and 610F share a dependency on build component 610E.

It may be possible for automated build process 600 to construct some or all of the targets 620 before beginning the automated build process. This approach moves the cost of target generation to the front end of the project. Using this approach, automated build process 600 may not actually save any time but may simply move target generation outside of the main project phase. Automated build process 600 may also organize the targets 620 so that automated build process 600 constructs targets 620 before the dependent build components 610. In some examples, automated build process 600 may schedule the construction of build component 610A before the construction of build component 610D so that the construction of build component 610D can use the contents of build component 610A.

In some examples, automated build process 600 may identify a set of two or more targets 620 based at least in part on an overlap threshold. Automated build process 600 may compare a proportion of the overlap between two or more targets 620 (e.g., 620D and 620E) with the overlap threshold. Automated build process 600 may then integrate the two or more targets 620 in response to determining that the proportion of the overlap between the two or more targets 620 is greater than the overlap threshold. The overlap threshold may represent a percentage of the content in the two or more targets 620. The overlap threshold may also represent an amount of content contained among the two or more targets 620. In some examples, the overlap threshold may change based at least in part on whether the content of the two or more targets is internal or external to automated build process 600.

Figure 7:
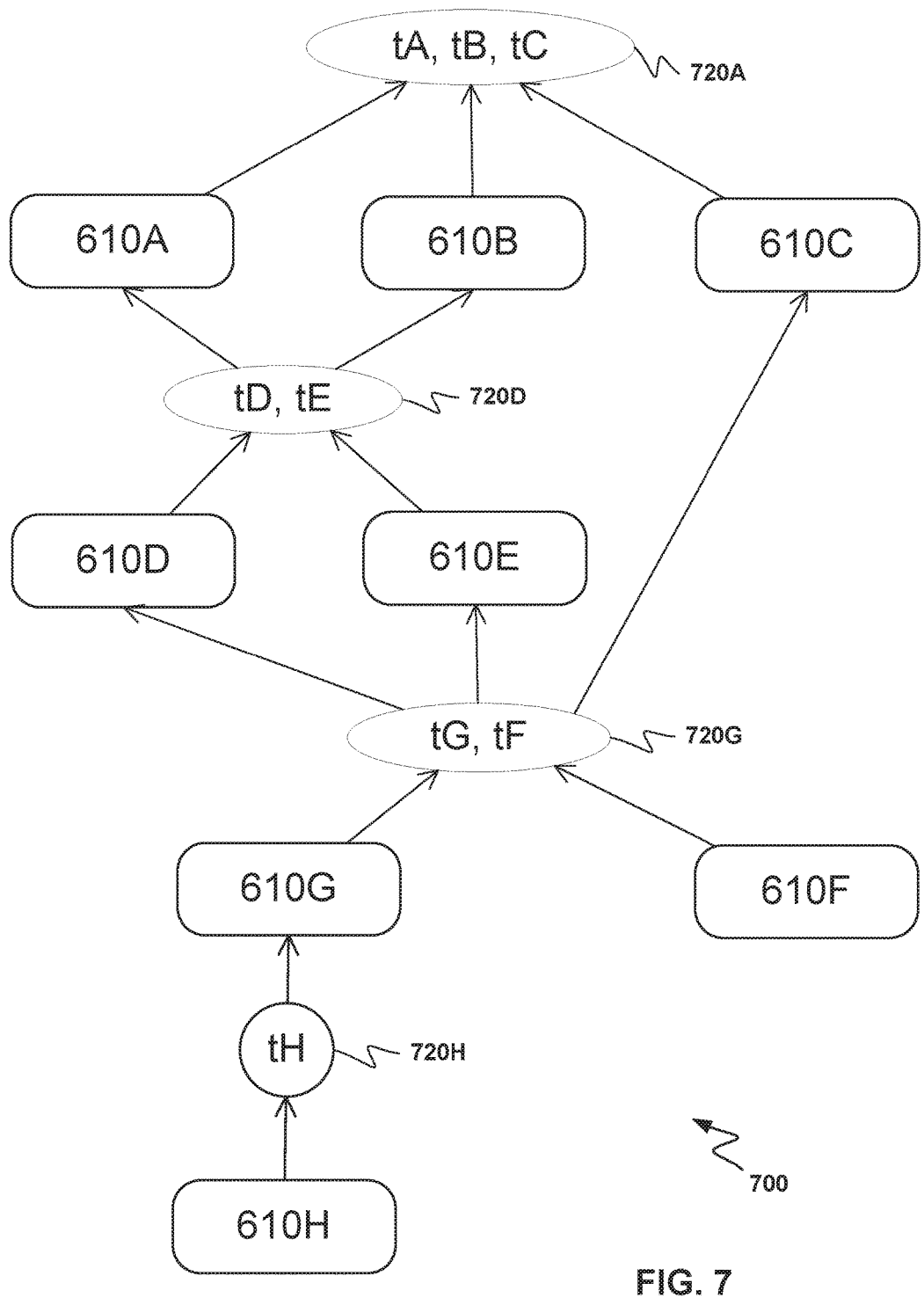
FIG. 7 shows a conceptual block diagram illustrating an example shared software target strategy for a componentized automated build process including a plurality of build components and a plurality of targets, in some examples of this disclosure.

FIG. 7 is a conceptual block diagram depicting an example shared software target strategy for componentized automated build process 700 including a plurality of build components 610 and a plurality of targets 720, in some examples of this disclosure. In some examples, build component 610G and build component 610F may have targets tG and tF. Targets tG and tF may be combined such that build components 610F and 610G share target 720G. Consequently, automated build process 700 may construct build components 610C, 610D, and 610E only once and use the contents of build components 610C, 610D, and 610E for the construction of build components 610F and 610G through target 720G.

There may be a large amount of overlap between the contents in the software targets of components 610 in automated build process 700, including some targets that may be subsets of other targets 720. Rather than building a separate software target for each component 610, components 610 may share software targets that include the contents of targets 720. If this approach is taken to the extreme case, automated build process 700 may construct a single target 720 made up of all of the dependencies of components 610. Targets 720 may link to further content so that any content that is created internally which is later needed by another build component 610 in the build can be linked for that build component's use. Using only one target, or fewer targets in general, may eliminate a large amount of the redundancy in target generation and minimize the number of times that automated build process 700 constructs a particular target. This approach may reduce the overhead costs associated with target creation, thereby increasing the speed and performance of automated build process 700.

In some examples, automated build process 700 may identify an ordered build process sequence (not shown in FIG. 7) in which components 610 belong to at least a first set of components (e.g., 610A, 610B, and 610C) to construct in the ordered build process sequence of a second set of components (e.g., 610D and 610E) to construct after the first set of components. Automated build process 700 may identify a first set of targets tA, tB, and tC as being dependencies of the first set of components 610A, 610B, and 610C to construct in the ordered build process sequence and a second set of targets tD and tE as being dependencies of the second set of components 610D and 610E to construct in the ordered build process sequence. Automated build process 700 may integrate the first set of targets tA, tB, and tC into first integrated software target 720A, and integrate the second set of targets tD and tE into second integrated software target 720D.

In some examples, automated build process 700 may identify one or more of components that belong to an Nth set of components (e.g., 610F and 610G) to construct after the second set of components 610D and 610E to construct in the ordered build process sequence. Automated build process 700 may identify an Nth set of targets tF and tG as being dependencies of the Nth set of components 610F and 610G. Automated build process 700 may integrate the Nth set of targets tF and tG into an Nth integrated software target 720G.

Figure 8:
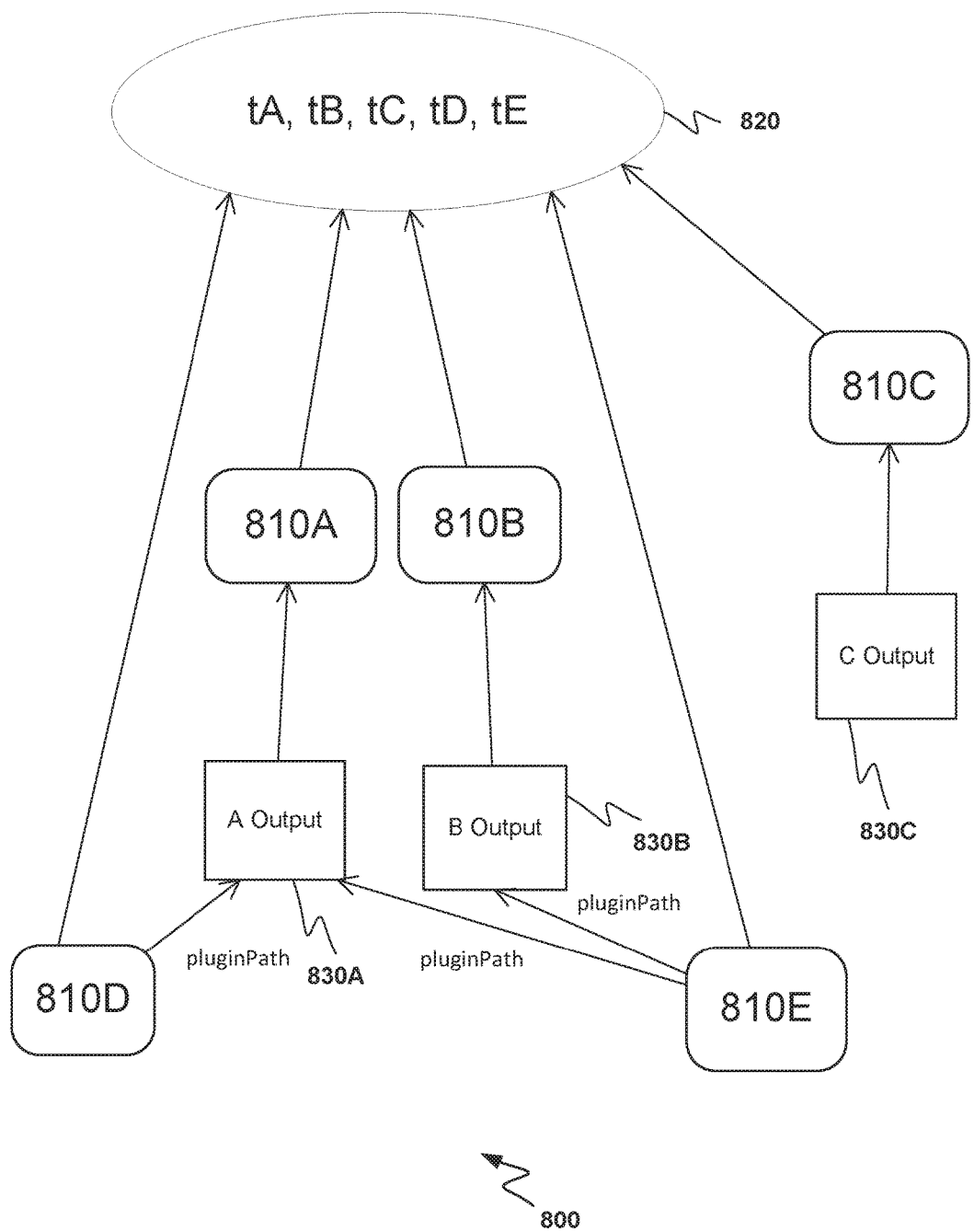
FIG. 8 is a conceptual block diagram depicting a common component build (CCB) maximal sharing build including a plurality of build components and an integrated target, in some examples of this disclosure.

FIG. 8 is a conceptual block diagram depicting an example common component build (CCB) maximal sharing build 800 ("automated build process 800") including a plurality of build components 810 and integrated target 820, in some examples of this disclosure. Each of the build components 810 in automated build process 800 may specify a list of dependencies that automated build process 800 may include in integrated target 820. Automated build process 800 may gather the dependencies into a set of all of automated build process 800's dependencies and create a target from the dependencies. Automated build process 800 may separate the dependencies into the dependencies that are external to automated build process 800 and the dependencies that automated build process 800 may satisfy internally as automated build process 800 progresses. Automated build process 800 may create integrated target 820 that includes all of the external dependencies, and components 810 may use integrated target 820 as their primary target. In some examples, integrated target 820 may include all of the dependencies, both internal and external.

In some examples, a CCB tool may use a program called Eclipse® Plug-in Development (PDE)/Build to build components. PDE/Build may generate outputs 830 as part of PDE/Build's build process. PDE/Build may also contain a pluginPath property for build component 810E, which may specify the location of output 830A from build component 810A so that build component 810E may include the content of output 830A in its target. In one example, component 810D may receive output 830A, which may contain the contents of component 810A, and on which component 810D depends. Build component 810D may receive output 830A via the pluginPath property, and automated build process 800 may include output 830A in the target for component 810D. To increase efficiency, automated build process 800 may construct component 810A before components 810D and 810E so that automated build process 800 can use output 830A for the construction of components 810D and 810E.

Automated build process 800 may be executed using integrated target 820 and the assigned dependencies of components 810A-810E. Automated build process 800 may then provide the contents of integrated target 820 to components 810 that have a dependency on integrated target 820. Automated build process 800 may further determine the order in which to execute components 810. Automated build process 800 may base the determined build order at least in part on the dependencies of components 810. For example, if components 810D and 810E are dependent on the content of components 810A and 810B, automated build process 800 may decide to construct components 810A and 810B before constructing components 810D and 810E. Automated build process 800 may then provide the contents of components 810A and 810B for the construction of components 810D and 810E. Implementations of this disclosure may thus enable faster and higher performance automated software build processes for large enterprise software products.

Figure 9:
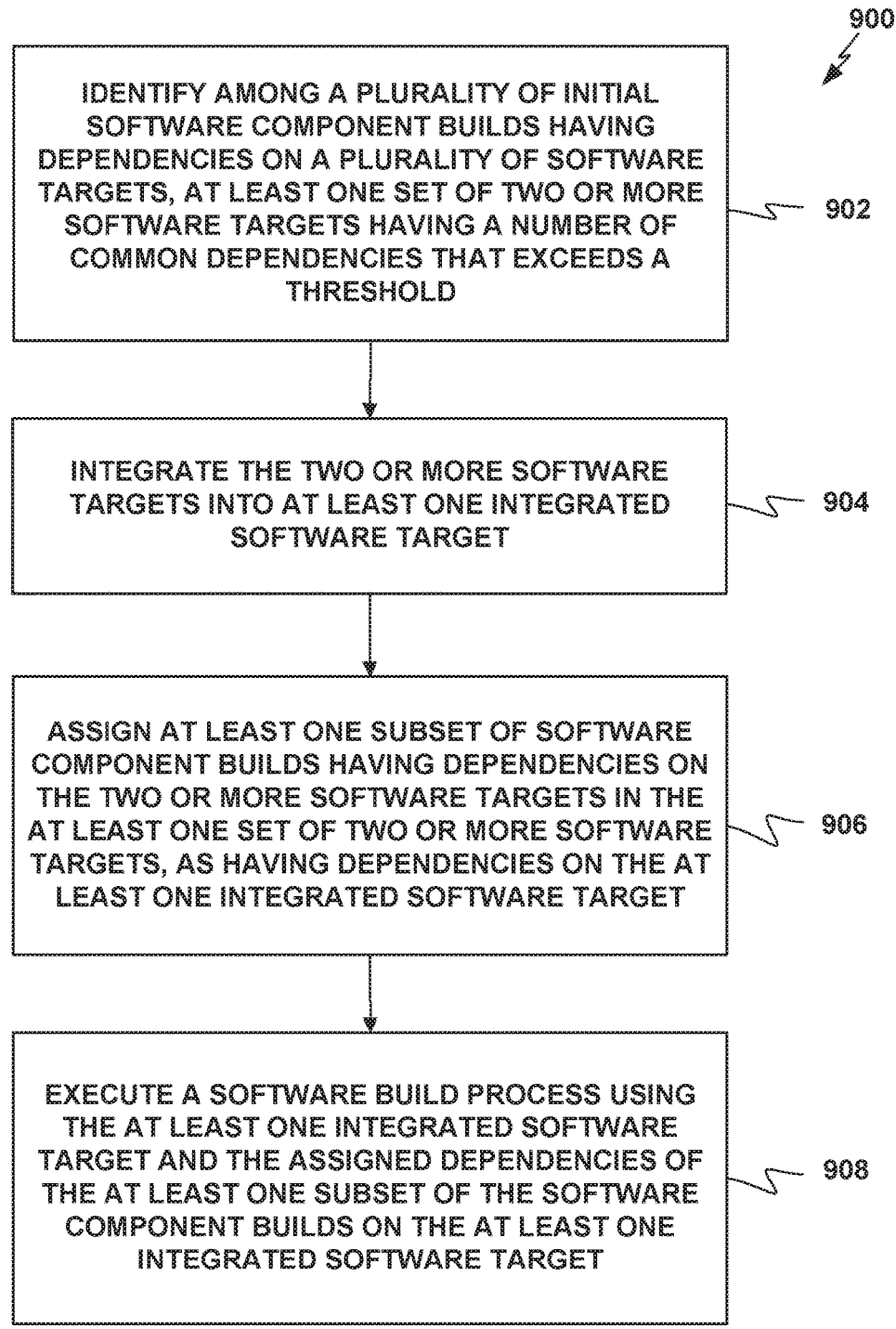
FIG. 9 depicts a flowchart of an example process for an automated build process that a software component build system, executing on one or more computing devices (e.g., servers, computers, processors, etc.), may perform, in some examples of this disclosure.

FIG. 9 depicts a flowchart of an example process 900 for an automated build process that software component build system 22, executing on one or more computing devices (e.g., servers, computers, processors, etc.), may perform, in some examples of this disclosure. Process 900 may include identifying, among a plurality of initial software component builds having dependencies on a plurality of software targets, at least one set of two or more software targets having a number of common dependencies that exceeds a threshold (902) (e.g., 330 as described above). Process 900 may further include integrating the two or more software targets into at least one integrated software target (904). Process 900 may further include assigning at least one subset of software component builds having dependencies on the two or more software targets in the at least one set of two or more software targets, as having dependencies on the at least one integrated software target (906). Process 900 may further include executing a software build process using the at least one integrated software target and the assigned dependencies of the at least one subset of the software component builds on the at least one integrated software target (e.g., 336 as described above). Various implementations of process 900 may also include any of the processes described above.

Figure 10:
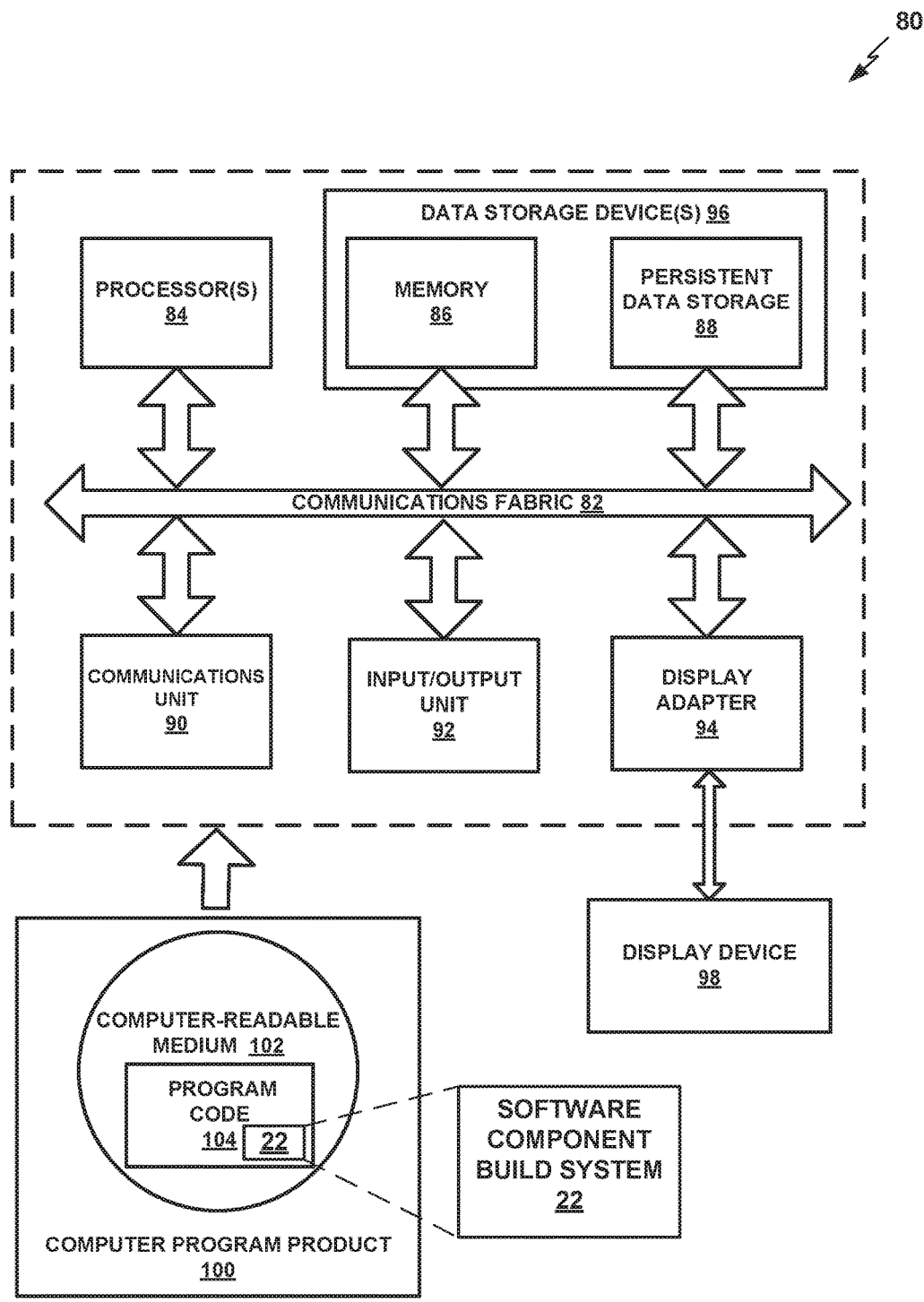
FIG. 10 is a block diagram of a computing device that may be used to execute a software component build system, in some examples of this disclosure.

FIG. 10 is a block diagram of a computing device 80 that may be used to execute a software component build system 22, in one aspect of this disclosure. Computing device 80 may be a server such as one of application servers 14A as depicted in FIG. 2. Computing device 80 may also be any server for providing an enterprise business intelligence application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 80 may include a computer having capabilities or formats other than or beyond those described herein.

In the illustrative example of FIG. 10, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may include one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage mediums. Persistent data storage 88 may store computer-executable instructions or computer-readable program code for an operating system, application files including program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical computer-readable data storage devices. Data storage 96 may include any of various forms of volatile memory that may require being periodically electrically refreshed to maintain data in memory, while those skilled in the art will recognize that this also constitutes an example of a physical computer-readable data storage device. Executable instructions may be stored on a physical medium when program code is loaded, stored, relayed, buffered, or cached on a physical medium or device, including if only for only a short duration or only in a volatile memory format.

Processor unit 84 can also be suitably programmed to read, load, and execute computer-executable instructions or computer-readable program code for a software component build system 22, as described in greater detail above. This program code may be stored on memory 86, persistent data storage 88, or elsewhere in computing device 80. This program code may also take the form of program code 104 stored on computer-readable medium 102 included in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which includes a computer-readable medium 102 having computer program code 104 stored thereon. For example, computer-readable medium 102 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions included in program code 104.

In some illustrative examples, program code 104 may be downloaded over a network to data storage 96 from another device or computer system for use within computing device 80. Program code 104 including computer-executable instructions may be communicated or transferred to computing device 80 from computer-readable medium 102 through a hard-line or wireless communications link to communications unit 90 and/or through a connection to input/output unit 92. Computer-readable medium 102 including program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over mediums, such as communications links or wireless transmissions containing the program code 104. Program code 104 may be more or less temporarily or durably stored on any number of intermediate physical computer-readable devices and mediums, such as any number of physical buffers, caches, main memory, or data storage components of servers, gateways, network nodes, mobility management entities, or other network assets, en route from the original source medium of program code 104 to computing device 80.

The present invention may be a system, a method, and/or a computer program product at any possible technical level of integration. The computer program product may include a computer readable storage medium (or mediums) having computer readable program instructions thereon for causing a processor to carry out aspects of the present invention.

The computer readable storage medium may be a device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission mediums (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    identifying, with one or more processing devices, among a plurality of initial software component builds having dependencies on a plurality of software targets, at least one set of two or more software targets having a number of common dependencies that exceeds a threshold of at least a selected percentage of the dependencies that the at least one set of two or more software targets have in common, the threshold based on whether the at least one set of two or more software targets is internal or external to the plurality of initial software component builds;
    integrating, with the one or more processing devices, the two or more software targets into at least one integrated software target, the at least one integrated software target being shared by at least two of the plurality of initial software component builds;
    assigning, with the one or more processing devices, at least one subset of software component builds having dependencies on the two or more software targets in the at least one set of two or more software targets, as having dependencies on the at least one integrated software target; and
    executing, with the one or more processing devices, a software build process using the at least one integrated software target and the assigned dependencies of the at least one subset of the software component builds on the at least one integrated software target.

2. The method of claim 1, further comprising:
    identifying, with the one or more processing devices, an ordered build process sequence in which the software component builds belong to at least a first set of software component builds to construct in the ordered build process sequence or a second set of software component builds to construct after the first set of software component builds to construct in the ordered build process sequence;
    identifying, with the one or more processing devices, at least a first set of the software targets as being dependencies of the first set of software component builds to construct in the ordered build process sequence or a second set of the software targets as being dependencies of a second set of software component builds to construct in the ordered build process sequence; and
    integrating, with the one or more processing devices, the first set of the software targets into a first integrated software target, or integrating the second set of the software targets into a second integrated software target.

3. The method of claim 2, wherein identifying the ordered build process sequence further comprises identifying one or more of the software component builds belonging to an Nth set of software component builds to construct after the second set of software component builds to construct in the ordered build process sequence, the method further comprising:
    identifying, with the one or more processing devices, an Nth set of the software targets as being dependencies of the Nth set of software component builds to construct in the ordered build process sequence; and
    integrating, with the one or more processing devices, the Nth set of the software targets into an Nth integrated software target.

4. The method of claim 1, further comprising:
    executing, with the one or more processing devices, the software component builds having no internal dependencies before executing the software component builds having one or more internal dependencies.

5. The method of claim 1, further comprising:
    separating, with the one or more processing devices, a set of the assigned dependencies into a subset of dependencies external to the software build process, and a subset of dependencies internal to the software build process; and
    generating, with the one or more processing devices, at least one integrated software target containing all of the dependencies external to the software build process.

6. The method of claim 1, further comprising:
    determining, with the one or more processing devices, one or more software component builds of the plurality of software component builds to execute first based at least in part on the assigned dependencies of the at least one subset of the software component builds.

7. The method of claim 1, further comprising:
using, with the one or more processing devices, parallel build processes to construct the software component builds.

8. The method of claim 1, wherein integrating the two or more software targets into at least one integrated software target comprises:
integrating all of the software targets into one integrated software target.

9. A computer program product comprising a non-transitory computer-readable storage medium having program code embodied therewith, the program code executable by a computing device to:
identify among a plurality of initial software component builds having dependencies on a plurality of software targets, at least one set of two or more software targets having a number of common dependencies that exceeds a threshold of at least a selected percentage of the dependencies that the at least one set of two or more software targets have in common, the threshold based on whether the at least one set of two or more software targets is internal or external to the plurality of initial software component builds;
integrate the two or more software targets into at least one integrated software target, the at least one integrated software target being shared by at least two of the plurality of initial software component builds;
assign at least one subset of software component builds having dependencies on the two or more software targets in the at least one set of two or more software targets, as having dependencies on the at least one integrated software target; and
execute a software build process using the at least one integrated software target and the assigned dependencies of the at least one subset of the software component builds on the at least one integrated software target.

10. The computer program product of claim 9, wherein the program code is further executable by the computing device to:
identify an ordered build process sequence in which the software component builds belong to at least a first set of software component builds to construct in the ordered build process sequence or a second set of software component builds to construct after the first set of software component builds to construct in the ordered build process sequence;
identify at least a first set of the software targets as being dependencies of the first set of software component builds to construct in the ordered build process sequence or a second set of the software targets as being dependencies of a second set of software component builds to construct in the ordered build process sequence; and
integrate the first set of the software targets into a first integrated software target, or integrate the second set of the software targets into a second integrated software target.

11. The computer program product of claim 10, wherein identifying the ordered build process sequence further comprises identifying one or more of the software component builds belonging to an Nth set of software component builds to construct after the second set of software component builds to construct in the ordered build process sequence; wherein the program code is further executable to:
identify an Nth set of the software targets as being dependencies of the Nth set of software component builds to construct in the ordered build process sequence; and
integrate the Nth set of the software targets into an Nth integrated software target.

12. The computer program product of claim 9, wherein the program code is further executable by the computing device to execute the software component builds having no internal dependencies before executing the software component builds having one or more internal dependencies.

13. The computer program product of claim 9, wherein the program code is further executable by the computing device to:
separate a set of the assigned dependencies into a subset of dependencies external to the software build process, and a subset of dependencies internal to the software build process; and
generate at least one integrated software target containing all of the dependencies external to the software build process.

14. A computer system comprising:
one or more processors, one or more computer-readable memories, and one or more computer-readable storage mediums;
program instructions, stored on at least one of the one or more storage mediums for execution by at least one of the one or more processors via at least one of the one or more memories, to identify among a plurality of initial software component builds having dependencies on a plurality of software targets, at least one set of two or more software targets having a number of common dependencies that exceeds a threshold of at least a selected percentage of the dependencies that the at least one set of two or more software targets have in common, the threshold based on whether the at least one set of two or more software targets is internal or external to the plurality of initial software component builds;
program instructions, stored on at least one of the one or more storage mediums for execution by at least one of the one or more processors via at least one of the one or more memories, to integrate the two or more software targets into at least one integrated software target, the at least one integrated software target being shared by at least two of the plurality of initial software component builds;
program instructions, stored on at least one of the one or more storage mediums for execution by at least one of the one or more processors via at least one of the one or more memories, to assign at least one subset of software component builds having dependencies on the two or more software targets in the at least one set of two or more software targets, as having dependencies on the at least one integrated software target; and
program instructions, stored on at least one of the one or more storage mediums for execution by at least one of the one or more processors via at least one of the one or more memories, to execute a software build process using the at least one integrated software target and the assigned dependencies of the at least one subset of the software component builds on the at least one integrated software target.

15. The computer system of claim 14, further comprising program instructions to
identify an ordered build process sequence in which the software component builds belong to at least a first set of software component builds to construct in the ordered build process sequence or a second set of software component builds to construct after the first set of software component builds to construct in the ordered build process sequence;

identify at least a first set of the software targets as being dependencies of the first set of software component builds to construct in the ordered build process sequence or a second set of the software targets as being dependencies of a second set of software component builds to construct in the ordered build process sequence; and integrate the first set of the software targets into a first integrated software target, or integrating the second set of the software targets into a second integrated software target.

16. The computer system of claim 15, wherein the program instructions to identify the ordered build process sequence further comprises identifying one or more of the software component builds belonging to an Nth set of software component builds to construct after the second set of software component builds to construct in the ordered build process sequence, wherein the computer system further comprises:

identifying an Nth set of the software targets as being dependencies of the Nth set of software component builds to construct in the ordered build process sequence; and integrating the Nth set of the software targets into an Nth integrated software target.

17. The computer system of claim 14, further comprising program instructions to execute the software component builds having no internal dependencies before executing the software component builds having one or more internal dependencies.

18. The computer system of claim 14, further comprising program instructions to separate a set of the assigned dependencies into a subset of dependencies external to the software build process, and a subset of dependencies internal to the software build process; and generate at least one integrated software target containing all of the dependencies external to the software build process.

19. The method of claim 1, wherein the threshold of at least the selected percentage of the dependencies that the set of two or more software targets have in common is at least 50%.

20. The method of claim 1, wherein the threshold of at least the selected percentage of the dependencies that the set of two or more software targets have in common is greater than zero.

* * * * *